(No Model.)

A. A. CURTIS.
BAKING DISH COVER.

No. 287,635. Patented Oct. 30, 1883.

Witnesses
W. Henry Curtis
Oliver Hess

Inventor.
Alice A. Curtis

UNITED STATES PATENT OFFICE.

ALICE A. CURTIS, OF BYRON CENTRE, MICHIGAN.

BAKING-DISH COVER.

SPECIFICATION forming part of Letters Patent No. 287,635, dated October 30, 1883.

Application filed August 15, 1881. (No model.)

*To all whom it may concern:*

Be it known that I, ALICE A. CURTIS, a citizen of the United States, residing in Byron Centre, in the county of Kent and State of Michigan, have invented certain new and useful Improvements in Baking-Dish Covers; and I hereby declare that the following is a full, clear, and exact description of the same, reference being had to the accompanying drawings, in which—

Figure 1:
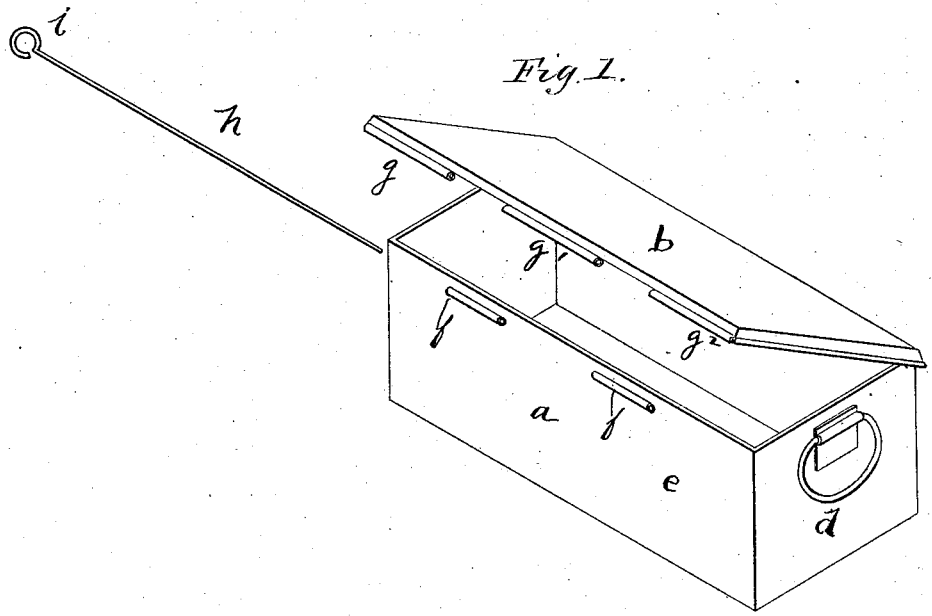
Figure 2:
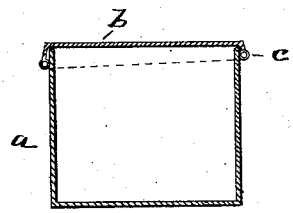

Figure 1 is a perspective view, and Fig. 2 is a vertical cross-section, of the device.

Referring by letter to the accompanying drawings, $a$ designates the dish, and $b$ the dish-cover, hinged at one side of the body, as shown at $c$. The body $a$ of the dish is provided at its ends with swinging hand pieces or rings $d$, by which the device may be handled.

The front wall, $e$, of the body $a$ is provided, near its upper edge, upon the outer side, with horizontal sleeves or tubes $f f$, located at short distances from the ends and middle of the front wall. The front edge of the hinged dish-cover $b$ is also provided with horizontal sleeves or tubes $g\ g'\ g^2$, located at the ends and midway of said edge, as shown, so that when the cover is closed the sleeves $f f$ and $g\ g'\ g^2$ will register, and a rod, $h$, having a ring-handle, $i$, may be passed through the respective sleeves to lock the cover on the dish.

The baking-dish is designed to be placed in the oven during the baking process, and may be turned over on all sides, in order to apply the heat evenly on all sides of the baking-dish.

The advantages of this cover are it retains the vapor that arises during the baking process, and this vapor keeps the crust from becoming too hard. The dough is prevented from running over, as it is confined, and it is thereby prevented from cracking, and the loaf presents a better appearance than when baked in open pans. The point of the rod is employed to test the contents of the dish, whether it be bread, cake, or the like, during the process of baking.

I am aware that it is not new to provide a baking-pan with a hinged cover, the free end of which is provided with sleeves or means for receiving a connecting bolt or rod, and therefore do not claim such, broadly; but,

Having thus fully described my invention, what I claim as new, and desire to secure by Letters Patent, is—

The combination, in a baking-dish having a hinged cover and sleeves arranged, respectively, upon the free edge of the cover and face of the pan, of the rod $h$, which is straight throughout its entire length, and provided with a ring-handle, $i$, adapted to serve the twofold function of a lock-rod and tester, substantially as specified.

ALICE A. CURTIS.

Witnesses:
OLIVER HESS,
W. HENRY CURTIS.